(12) United States Patent
Billhartz et al.

(10) Patent No.: US 8,217,805 B2
(45) Date of Patent: Jul. 10, 2012

(54) ADDRESS STRIPPING IN A METER READING WIRELESS MESH NETWORK AND ASSOCIATED SYSTEM

(75) Inventors: Thomas J. Billhartz, Melbourne, FL (US); George A. Waschka, Jr., Melbourne Beach, FL (US); Jim Bardgett, Oviedo, FL (US); Mary Lynne Loufek, Melbourne Beach, FL (US)

(73) Assignee: Harris Corporation, Melbourne, FL (US)

( * ) Notice: Subject to any disclaimer, the term of this patent is extended or adjusted under 35 U.S.C. 154(b) by 561 days.

(21) Appl. No.: 12/551,945

(22) Filed: Sep. 1, 2009

(65) Prior Publication Data
US 2011/0051702 A1 Mar. 3, 2011

(51) Int. Cl.
*G08C 15/06* (2006.01)
(52) U.S. Cl. .............................. 340/870.02; 340/870.03
(58) Field of Classification Search ............. 340/870.02, 340/870.03; 370/338, 310, 216, 312, 252, 370/241, 256, 254, 351, 401
See application file for complete search history.

(56) References Cited

U.S. PATENT DOCUMENTS

| 7,035,207 | B2 | 4/2006 | Winter et al. ................. | 370/225 |
| 2008/0282182 | A1 | 11/2008 | Oosaka ......................... | 715/772 |
| 2008/0310377 | A1 | 12/2008 | Flammer et al. .............. | 370/338 |
| 2009/0146838 | A1 | 6/2009 | Katz ........................ | 340/870.02 |
| 2009/0262642 | A1* | 10/2009 | van Greunen et al. ........ | 370/216 |

FOREIGN PATENT DOCUMENTS

| WO | 2008/057595 | 5/2008 |
| WO | 2009/067251 | 5/2009 |

OTHER PUBLICATIONS

Hong, et al. *Scalable Routing Protocols for Mobile Ad Hoc Networks*: University of California, Los Angeles, CA.
*Automatic Meter Reading*: Application Note; SkyPilot Networks Santa Clara California 95054, www.skypilot.com.
*Advanced RF Mesh Metering Solution for Residential Application*: LandisGyr. Alpharetta, GA 30022, wwwllandisgyr.com.

* cited by examiner

*Primary Examiner* — Joseph Lauture
(74) *Attorney, Agent, or Firm* — Allen, Dyer, Doppelt, Milbrath & Gilchrist, P.A.

(57) ABSTRACT

A meter reading system includes a meter reading wireless mesh network having wireless meter reading nodes in communication with an access point. Each wireless meter reading node has an address associated therewith. The meter reading wireless mesh network is configured to define a given downstream route, from the access point to a given node via successive intermediate nodes, based upon addresses of the successive intermediate nodes and the given node. The respective address at each successive intermediate node is stripped while routing data along the given downstream route from the access point to the given node.

28 Claims, 15 Drawing Sheets

ADDRESS STRIPPING IN A METER READING WIRELESS MESH NETWORK AND ASSOCIATED SYSTEM

FIELD OF THE INVENTION

The present invention relates to the field of wireless mesh networks, and more particularly, to wireless meter reading nodes operating as a wireless mesh network.

BACKGROUND OF THE INVENTION

Electrical power plants known as peaker plants are typically built to support peak loads, which generally occur in the afternoon. This is especially so during the summer months when the air conditioning load is high. Electricity during peak times is generated and/or provided at a higher cost as compared to electricity generated generally by base load power plants during off-peak times.

Peak load control is one approach for reducing the amount of electricity generated during peak times. With peak load control, consumers modify their level and pattern of electricity consumption to shed their peak electricity usage or to shift their usage from peak times to off-peak times.

Advanced metering infrastructure (AMI) systems measure, collect and analyze utility usage through a network. Information is distributed to customers, suppliers, utility companies and service providers. This enables power companies to provide demand response products and services to its customers. For instance, customers may alter energy usage patterns from normal consumption patterns in response to demand pricing. This improves system load and reliability.

AMI is configured as a wireless mesh network that routes data between wireless meter reading nodes and the utility company's data center, which ultimately passes the consumption data to a customer billing system at a remote station. Additionally, pricing data and other information is passed from the utility to the consumer. Example wireless meter reading nodes are provided by SkyPilot™ Networks and by Landis+Gyr™.

An advantage of a wireless mesh network is that continuous connections and reconfigurations around broken or blocked paths may be provided by retransmitting messages from a wireless meter reading node to another wireless meter reading node until a destination is reached. A mesh network differs from other networks in that wireless meter reading nodes can all connect to each other via multiple hops. Thus, mesh networks are self-healing and remain operational when wireless meter reading nodes or connections fail.

Current systems utilize mesh protocols that are general purpose and well established. These general purpose mesh protocols are intended to support mobile nodes.

An example mesh protocol is the ad hoc on-demand distance vector (AODV) routing protocol. AODV is a reactive routing protocol, meaning that it establishes a route to a destination only on demand. AODV involves next-hop route table management to be maintained at each node. Route discovery in AODV involves packet flooding. Route table information is kept even for short-lived routes, such as those created to temporarily store reverse paths toward nodes originating route requests.

Another example of a mesh protocol is the optimized link state routing (OLSR) protocol. OLSR is a proactive link-state routing protocol which uses hello and topology control messages to discover and then disseminate link state information throughout the network. The routes to all destinations within the network are known before use and are maintained with routing tables and periodic route management messaging. Since link-state routing requires the topology database to be synchronized across the network, OLSR floods topology data often enough to make sure that the database does not remain unsynchronized for extended periods of time.

Yet another example mesh protocol is the dynamic source routing (DSR) protocol. This protocol uses a reactive approach which also utilizes packet flooding. A route is established only when it is required. The ultimate route that is determined in DSR is a source route, as opposed to AODV's next-hop route.

One approach for a mesh protocol with stationary nodes, such as electricity meter reading nodes, is disclosed in U.S. Pat. No. 7,035,207. An ad-hoc network comprises a plurality of nodes, where each node has a unique ID and stores a table of nodes. When a node is added to the network, it detects the presence of adjacent nodes. The new node obtains the table stored in each adjacent node and uses that information to update its own table, thereby obtaining information for communicating with every other node in the network. Each of the adjacent nodes obtain information related to communicating with the new node, adjusts its own table of nodes accordingly, and sends update information to nodes adjacent to it to propagate knowledge of the new node.

An ad-hoc network applicable to automatic meter reading (AMR) is disclosed in U.S. published patent application no. 2009/0146838. The network includes stationary meter units coupled to utility meters, mobile relays and a central station. Data from the utility meters are propagated to the central station. Data hops from meter to meter, assisted by mobile relays, and ultimately arrive at the central station. Communication between low power meter units is effective over short distances, while mobile relays bridge over long gaps between the meters and the central station.

SUMMARY OF THE INVENTION

In view of the foregoing background, it is therefore an object of the present invention to provide wireless meter reading nodes operating within a wireless meter reading wireless mesh network that are low cost and/or efficiently use available bandwidth.

This and other objects, features, and advantages in accordance with the present invention are provided by a method for operating a meter reading wireless mesh network to efficiently strip addresses when routing packets between nodes within the network. More particularly, the network may comprise a plurality of wireless meter reading nodes in communication with an access point, with each wireless meter reading node having an address associated therewith. The method comprises defining a given downstream route, from the access point to a given node via successive intermediate nodes, based upon addresses of the successive intermediate nodes and the given node. The respective address at each successive intermediate node may be stripped while routing data along the given downstream route from the access point to the given node. Routing the data may comprise routing packet data along with the addresses of the successive intermediate nodes and the given node until stripped by one of the successive intermediate nodes.

Address stripping is also referred to as streamlined source routing. Source routing as used herein refers to a downstream route from the access point to a given node. Streamlined source routing advantageously strips off each node's address at each hop, thereby reducing the size of the remaining source route that is carried in the packet to the given node. Address stripping advantageously reduces memory and processing requirements for the wireless meter reading nodes operating within the network. Accordingly, the nodes may be low cost, and bandwidth is efficiently used.

For upstream communications, meter reading data may be routed from the already-registered nodes to the access point using the wireless mesh network. For downstream communications, load control data may be routed from the access point to the already-registered nodes using the wireless mesh network. Similarly, time-of-day billing data may be routed from the access point to the already-registered nodes using the wireless mesh network.

Communicating data along the upstream route from one node to a next node may be based on the address of the next node. This may comprise communicating packet data along with only the address of the next node.

Another aspect of the invention is directed to a meter reading system comprising a meter reading wireless mesh network comprising a plurality of wireless meter reading nodes in communication with an access point, where each wireless meter reading node has an address associated therewith. The meter reading wireless mesh network is configured to address strip when routing a packet as described above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notations are used to indicate similar elements in alternative embodiments.

Figure 1:
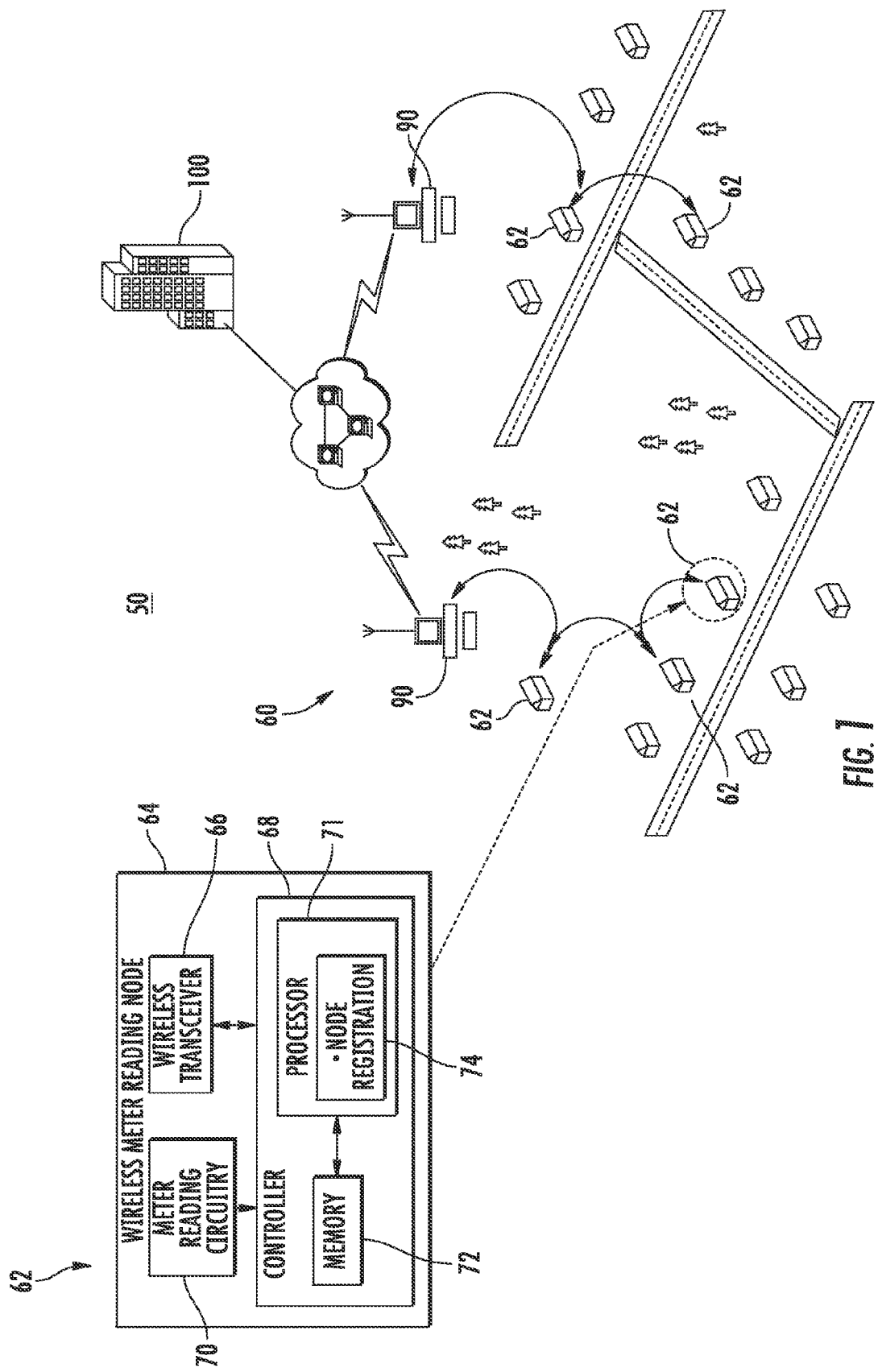
FIG. 1 is a schematic diagram of a meter reading system including wireless meter reading nodes operating with node registration in accordance with the present invention.
Figure 2:
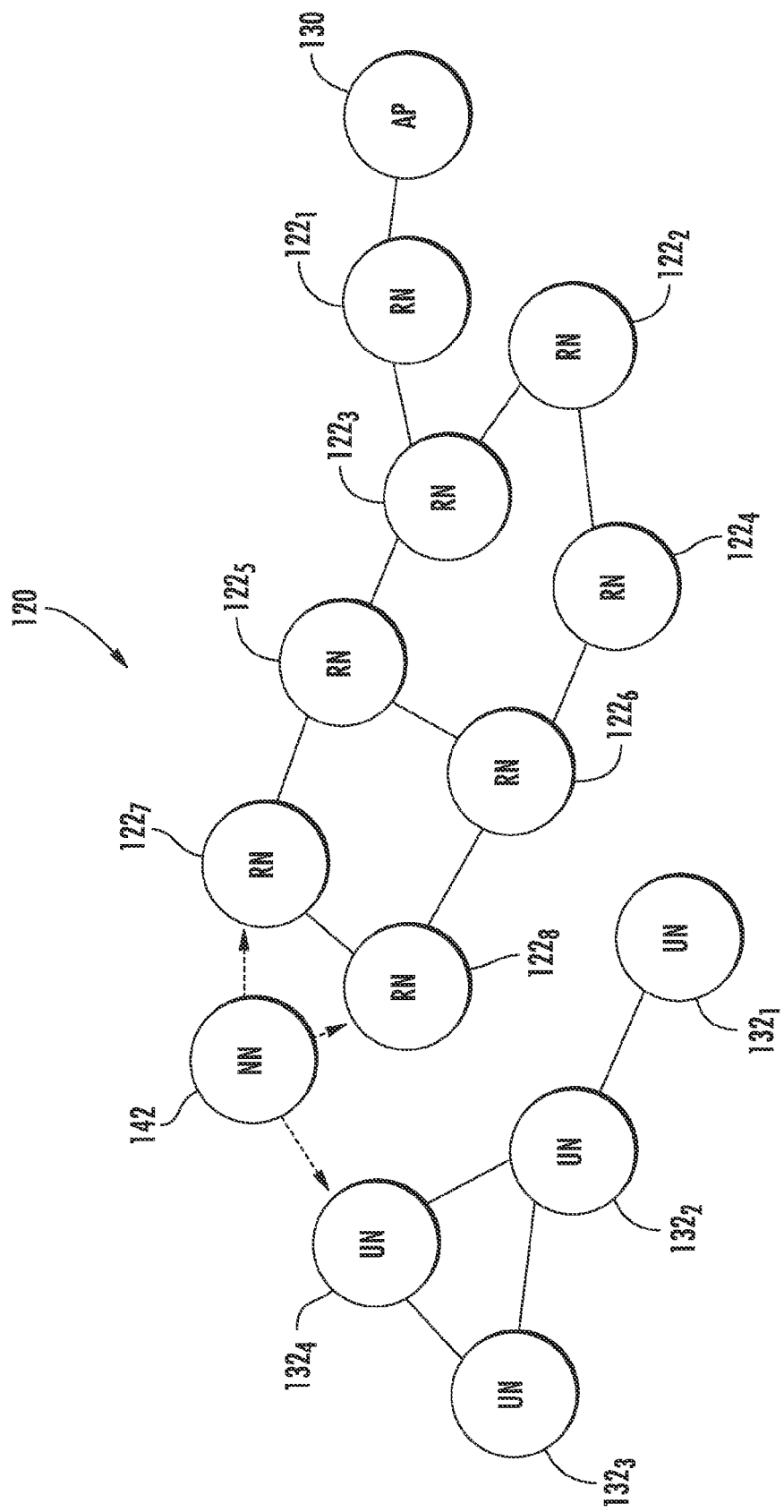
FIGS. 2-5 are schematic diagrams of an access point tree illustrating the registration process for adding a new wireless meter reading node to the meter reading system in accordance with the present invention.

Referring initially to FIG. 1, a meter reading system 50 comprises a meter reading wireless mesh network 60 and a remote station 100. The meter reading wireless mesh network 60 illustratively comprises a plurality of wireless meter reading nodes 62 for communication with respective access points 90. The access points 90 communicate with the remote station 100. The remote station 100 may include a customer billing system for a utility company. Each illustrated house has a wireless meter reading node 62 associated therewith.

For clarity of explanation, the wireless meter reading nodes 62 are illustratively directed to the monitoring, reporting and controlling of electricity by a consumer. The consumer may be a home or business, and more particularly, a single family/business unit or multi family/business unit. For illustration purposes, a single unit is shown. As readily appreciated by those skilled in the art, the wireless meter reading nodes 62 may be directed to other types of utilities, such as gas and water, for example.

Each wireless meter reading node 62 includes a housing 64, a wireless transceiver 66 carried by the housing, and a controller 68 coupled to the wireless transceiver within the housing. Meter reading circuitry 70 is also carried by the housing and is coupled to the controller 68. The wireless transceiver 66 may communicate using unlicensed ISM (industrial, scientific and medical) bands, such as 900 MHz, 2.4 GHz and 5.8 GHz, for example.

For upstream communications, the wireless transceivers 66 route meter reading data as determined by the meter reading circuitry 70 to the respective access points 90 using other nodes of the wireless mesh network 60. The access points 90 then pass the meter reading data to the remote station 100. In other embodiments, as few as one access point 90 may be used, or many hundreds or more may be used.

For downstream communications, the access points 90 route load control data to the wireless transceivers 66 using the wireless mesh network 60, such as to turn off selected appliances, for example. The data sent downstream may include time-of-day billing data, for example, and may be displayed to the consumer. Consumers can modify, via the network and appropriate application, their level and pattern of electricity consumption to shed their peak electricity usage or to shift their usage from peak times to off-peak times. For electrical power plants using demand pricing, this helps to reduce electricity bills for the consumers. In addition, system load and reliability are improved for the electrical power plants.

Each house may further include a wired or wireless home network, not shown, communicating with the wireless meter reading node 62 associated therewith, such as to run certain electrical appliances in response to the time-of-day billing data provided by an access point 90. These appliances include washer and dryers, dishwashers, heating and air conditioning units, for example. An example home network for communicating with electrical appliances is disclosed in U.S. published patent application no. 2008/0282182, which is incorporated herein by reference in its entirety.

The controller 68 includes a processor 71 and a memory 72 coupled to the processor. Although the processor 71 and memory 72 are illustrated as separate components, they may be integrated as a single component. As part of the mesh protocol, the processor 68 executes a node registration software module 74 when registering a node 62 with the meter reading wireless mesh network 60. As will be discussed in greater detail below, the node registration process advantageously reduces memory and processing requirements for the wireless meter reading nodes 62 operating within the network 60. Similar methods or procedurally modifying this process to include node security are a logical extension of this concept, for example, certificates and/or encryption may be used.

A first aspect of the mesh protocol is directed to node registration. Node registration will initially be discussed in reference to the access point tree illustrated in FIGS. 2-6. The access point tree 120 comprises a plurality of wireless meter reading nodes that include already-registered nodes $122_1$-$122_8$ (also labeled as RN for registered nodes) already registered for communication with an access point 130, and not-yet-registered nodes $132_1$-$132_4$ (also labeled as UN for unregistered nodes) not yet registered for communication with the access point 130. The already-registered nodes $122_1$-$122_9$ have completed the node registration process.

Wireless meter reading node 142 (labeled as NN for new node) is a new wireless meter reading node that wants to join the network 120 by registering with the access point 130. New wireless meter reading node 142 transmits a request to register message. As indicated by the dashed arrows in FIG. 2, the request to register message is received at neighboring already-registered nodes $122_7$ and $122_8$, and the request to register message is also received at a neighboring not-yet-registered node $132_4$. Even though other nodes in the network 120 would very likely receive the request to register message, a limited number of nodes is being shown as receiving the message to simplify the explanation.

Figure 3:
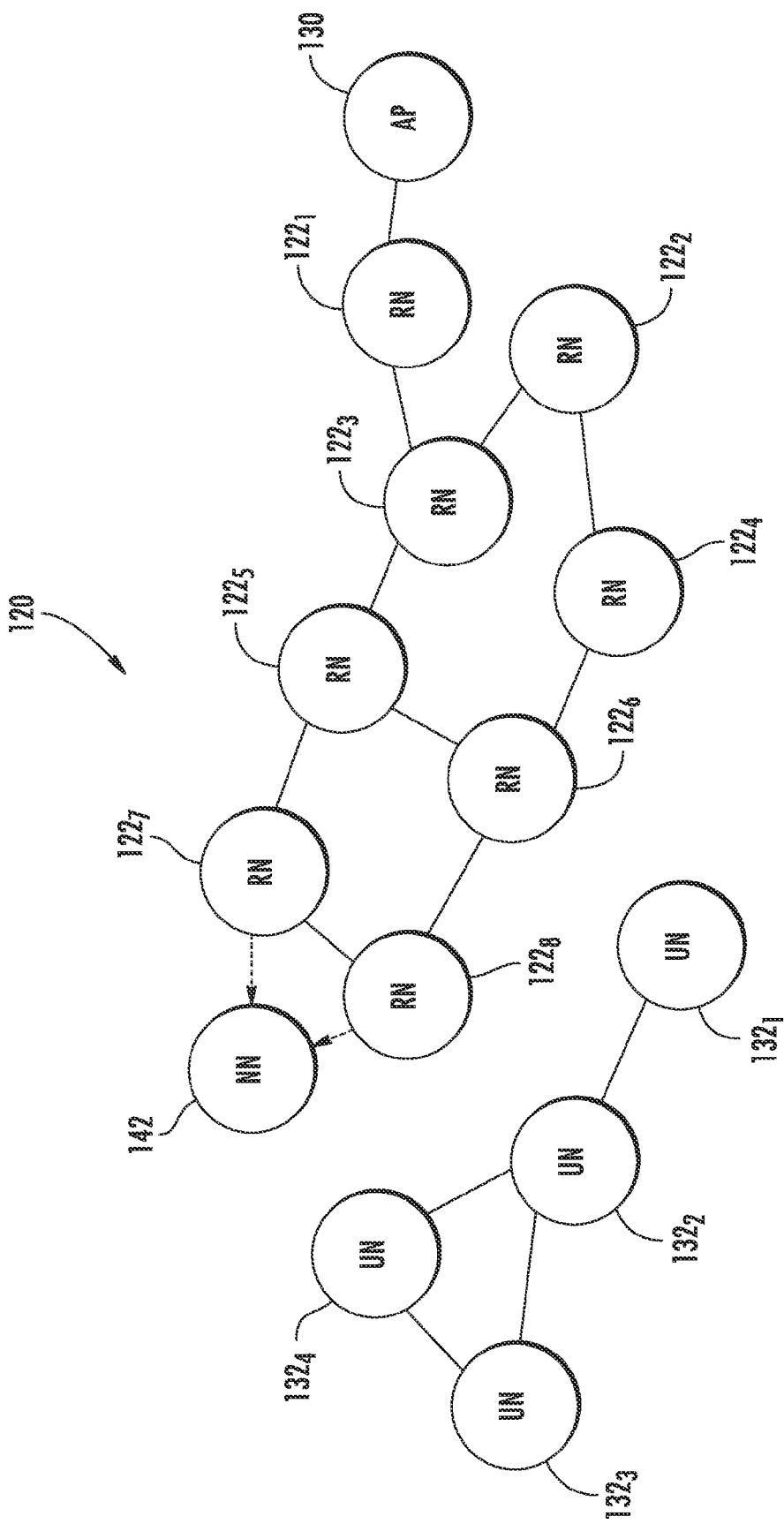

After a random interval to avoid collisions, neighboring already-registered nodes $122_7$ and $122_8$ transmit responses to the request to register message, as indicated by the dashed arrows in FIG. 3. If any other already-registered nodes also received the request to register message, then these nodes would also transmit responses. In sharp contrast, the neighboring not-yet-registered node $132_4$ does not transmit a response since it is not registered and has not determined an upstream neighbor through which it can communicate with the access point 130. Not transmitting a response avoids unnecessary traffic that would otherwise consume bandwidth. Furthermore, these not-yet-registered nodes do not forward the request to register message to any other nodes (flooding). Consequently, this advantageously reduces memory and processing requirements for each node since only the nodes already-registered respond to the request to register message. Moreover, more bandwidth is available for actual data transmissions since flooding is avoided during the registration process.

After the new wireless meter reading node 142 receives the responses from the neighboring already-registered nodes $122_7$ and $122_8$, it determines, based upon the responses, at least one selected already-registered node to use for upstream communication with the access point 130. To evaluate the responses, the new wireless meter reading node 142 determines at least one quality metric for each received response. The quality metric may comprise any combination of parameters, such as received signal strengths of the responses, error rates of the responses, hop counts to the access point 130, for example.

Based on the calculated metric(s), the new wireless meter reading node 142 illustratively selects neighboring already-registered node $122_7$ to send a register message thereto that will then be passed to the access point 130 via successive intermediate nodes $122_5$, $122_3$ and $122_1$. As indicated by the arrows in FIG. 4, the hop count associated with node $122_7$ to reach the access point 130 is 5, whereas the hop count associated with node $122_8$ to reach the access point 130 is 6. As noted above, other metrics, such as received signal strengths of the responses and error rates of the responses, may be taken into consideration when selecting a node.

In this example, node $122_7$ is selected to communicate to the access point 130 to thereby add the new wireless meter reading node 142 to the already-registered nodes. The access point 130 forwards the register message to the remote station 100. Registration confirmation is sent from the access point 130 to the new wireless meter reading node 142, as indicated by the arrow in FIG. 5.

For upstream communication with the access point 130, a message from the new wireless meter reading node 142 to the access point 130 may include a bit or bits indicating that the message is intended for the access point. Based on this bit, each wireless meter reading node $122_7$, $122_5$, $122_3$ and $122_1$ in the path to the access point 130 simply routes the message to its selected node, i.e., an already-registered node used to communicate to the access point 130. In other words, each node stores only the address of its selected already-registered node. This advantageously reduces memory and processing requirements since each node does not have to build and store routing information relating to any of the other registered nodes in the network.

Figure 4:
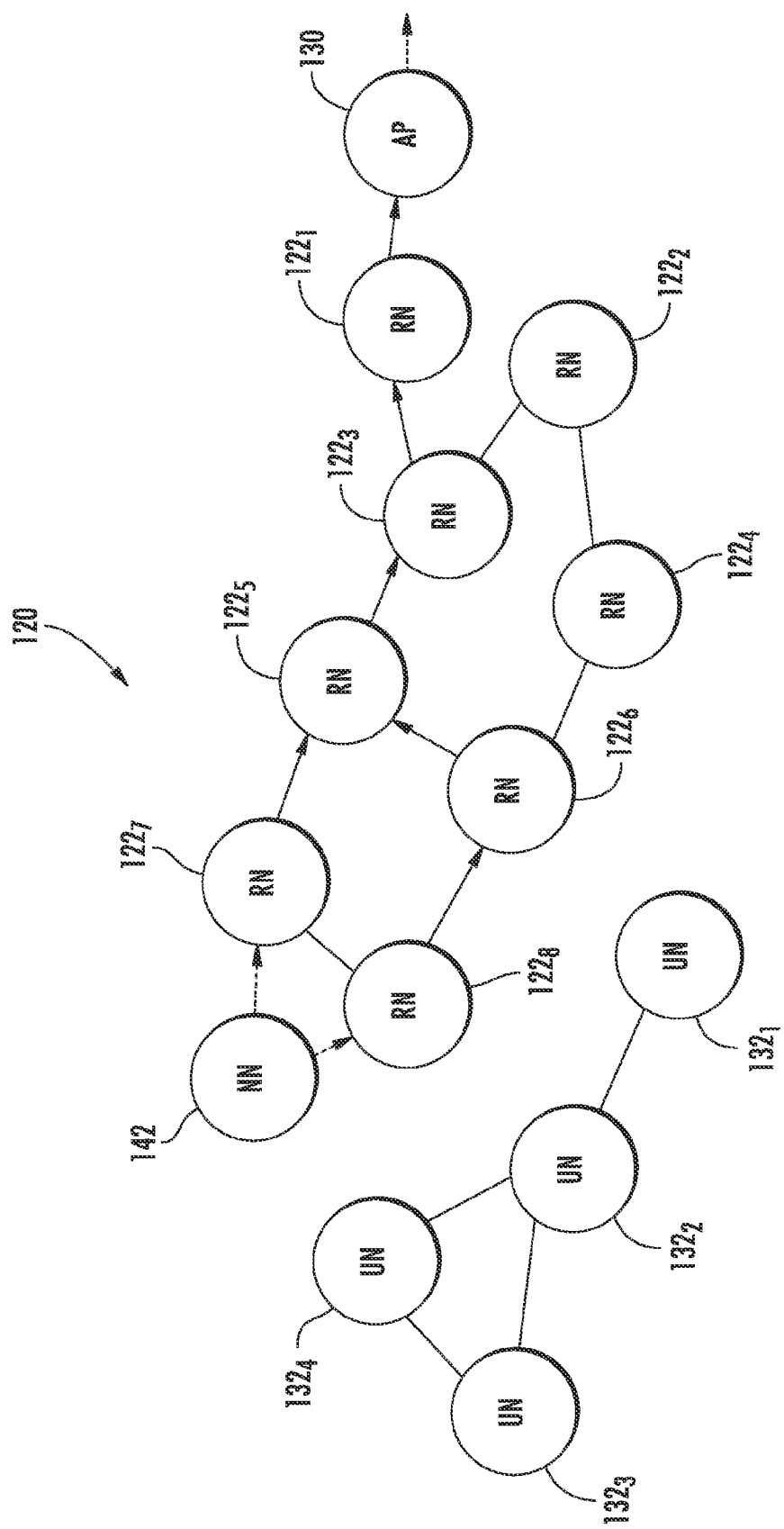
Figure 5:
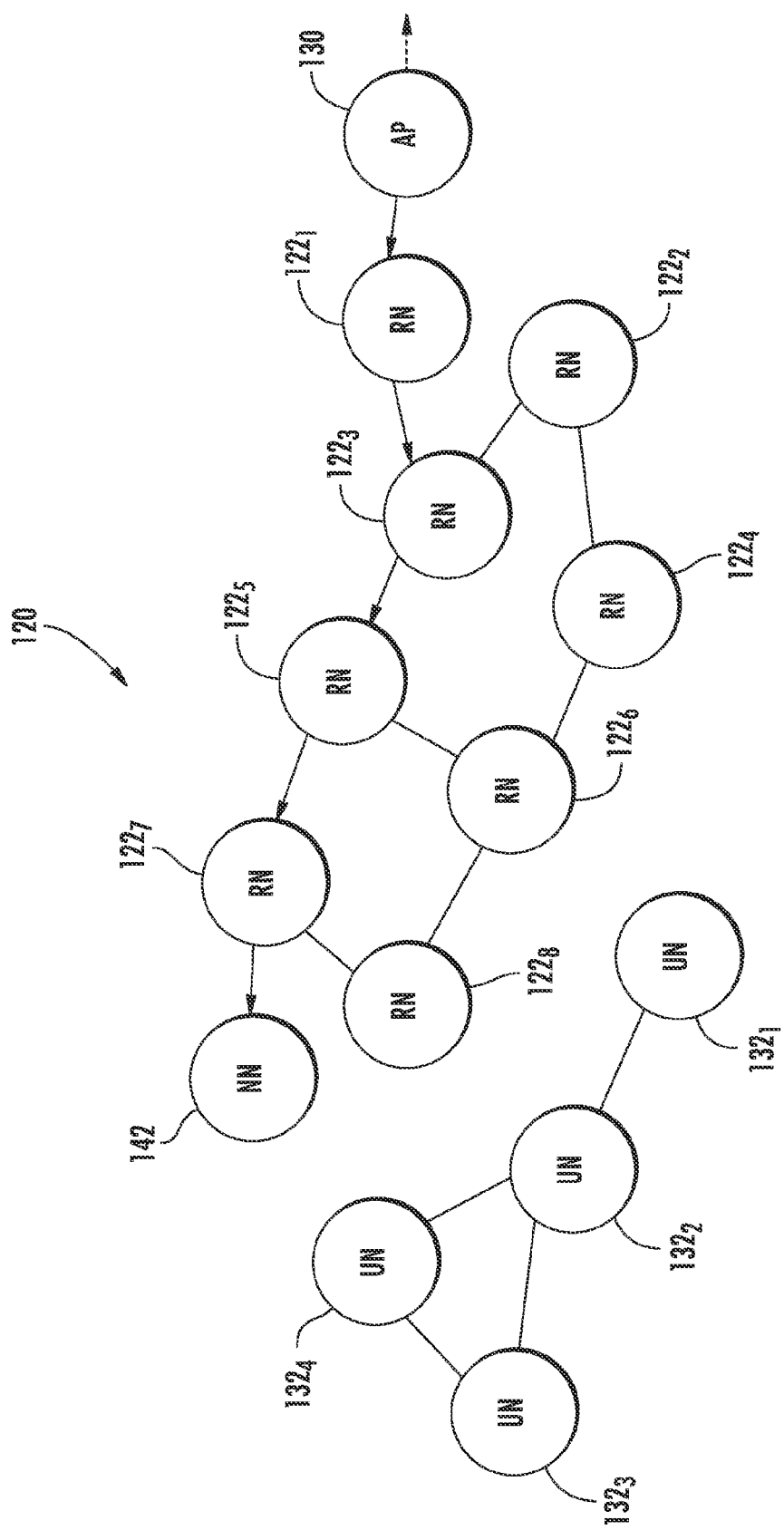

However, more than one node address may be stored by a node for redundancy/back-up purposes. In this case, a node may determine a primary and a back-up already-registered node so that it can switch from the primary already-registered node to the back-up already-registered node for communication to the access point 130 based upon a failure to communicate via the primary already-registered node. The respective addresses of the primary and back-up already-registered nodes would be stored by the node. For example, new node 142 may select node $122_7$ as the primary already-registered node and node $122_8$ as the back-up already-registered node, as shown in FIG. 4. New node 142 would store the address of each one of these two nodes.

Since node $122_1$ does not have an intervening node in upstream communication with the access point 130, this node stores the address of the access point 130. Although not illustrated, node $122_1$ may select a back-up node that is in communication with a different access point in the event that the selected access point 130 goes down.

Figure 6:
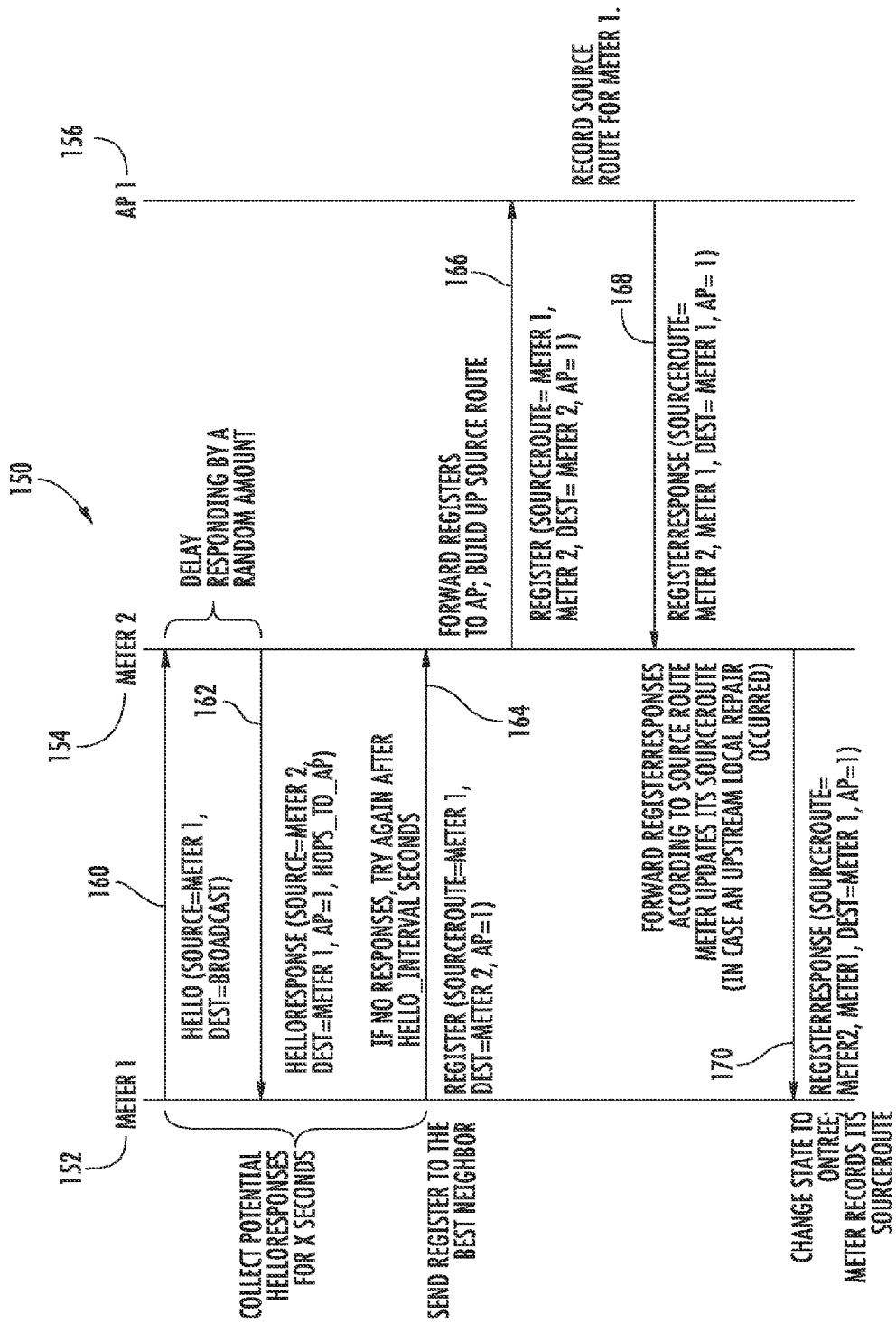
FIG. 6 is a sequence diagram illustrating the registration process for adding a new wireless meter reading node to the meter reading system in accordance with the present invention.

Referring now to FIG. 6, a sequence diagram 150 illustrating the registration process for adding a new wireless meter reading node to the meter reading system will now be discussed. A wireless meter reading node will now be referred to as a meter. Meter 1 152 is not on the access point tree, but meter 2 154 is on the access point tree in communication with the access point 156. Meter 1 152 is in range of meter 2 154 but not in range of the access point 156.

The request to register message as previously used will now be referred to as a hello broadcast, and responses to the hello broadcast are referred to as hello responses. All messages typically go up through the physical and MAC layer to the network layer, as readily understood by those skilled in the art. Meter 1 152 broadcasts a hello broadcast 160. Meter 2 responds by transmitting a hello response 162. The hello response 162 includes the source and destination of the response, as well as the number of hops between the access point 156 and meter 2 154.

In response to the received hello response 162, meter 1 152 transmits a register message 164 to meter 2 154. The register message 164 includes the source and destination of the message. Meter 2 154 forwards the register message 166 to the access point 156, which helps to build a source route between the access point 156 and meter 1 152. The access point 156 records the built source route to meter 1 152.

The access point 156 transmits a register response 168 to meter 2. Based on the source route provided with the register response 168, meter 2 forwards the register response 170 to meter 1 152. Meter 1 152 now changes it state as being on the access point tree, and records its source route.

Figure 7:
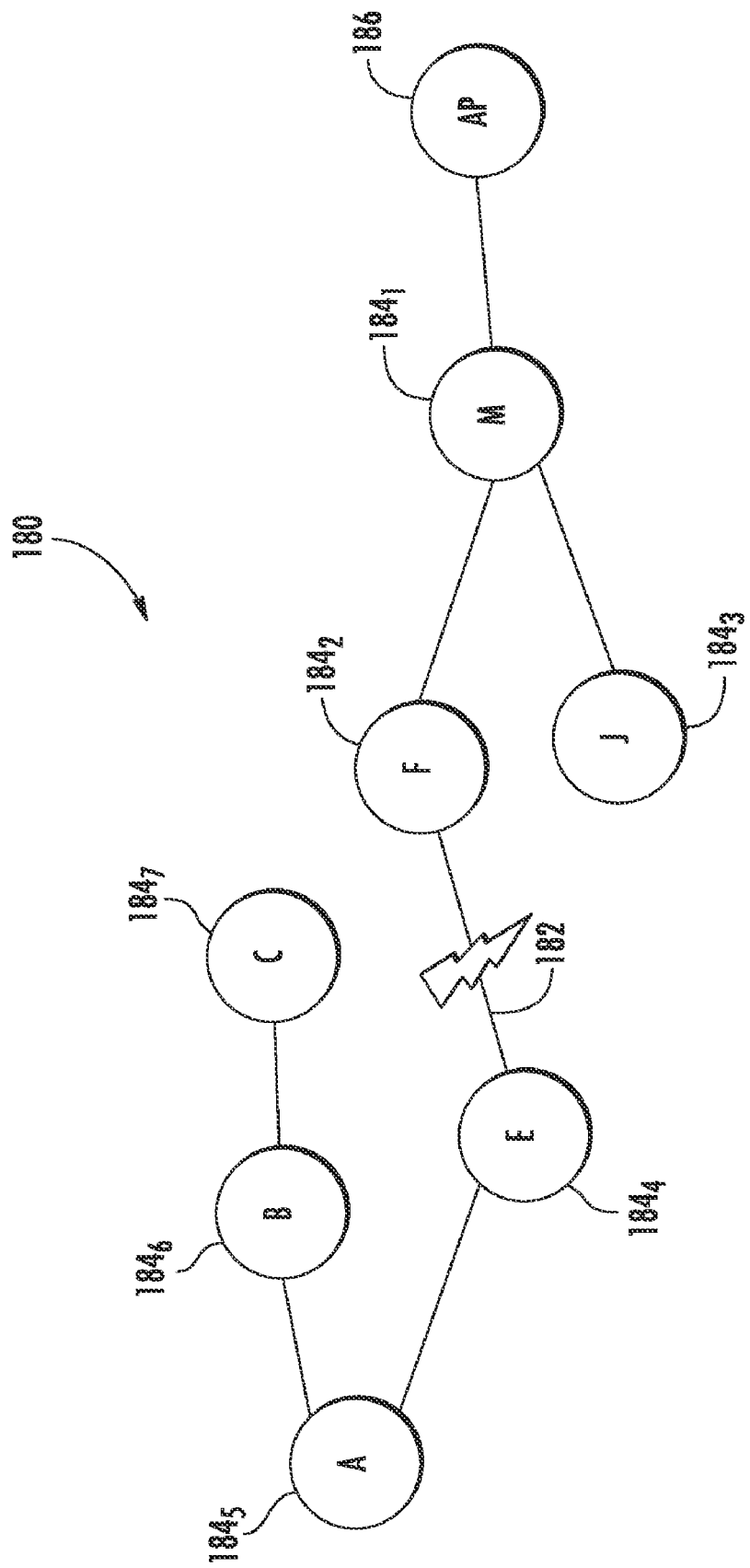
FIG. 7 is a schematic diagram of an access point tree illustrating repair of a broken link in accordance with the present invention.

Another approach for repair of a broken or down link within an access point tree 180 will now be discussed in reference to FIGS. 7-9. Mesh protocols need to be able to handle changes in node connectivity as links go down, nodes move out of range, etc. For mobile nodes, this ultimately requires some omniscient topology knowledge or sharing/storage of topology data between nodes. For advanced metering infrastructure (AMI) systems, there is typically no motion in the nodes. In other words, the nodes are stationary. Nonetheless, there may be minimal link dynamics due to foliage growth over time, large objects (e.g., a moving truck) parked in the way, and new building construction, etc.

The mesh protocol as discussed herein handles broken links while avoiding the sharing/storing of topology data via a "try-and-see" approach. A schematic diagram of an access point tree 180 illustrating repair of a broken link within the access point tree is provided in FIG. 7. Solid lines indicate that the tree 180 is formed by each node successfully registering with the access point 186. There is a break in link 182 between nodes $184_4$ and $184_2$. Node $184_4$ transmits a hello broadcast. In other words, if a link goes down, a node issues a hello broadcast as in route discovery as discussed above, and repeats the node registration process.

There are different ways for Node $184_4$ to determine that link 182 is down. There can be a link level ACK for each message transmitted. When Node $184_4$ transmits a message of any kind to Node $184_2$ and does not receive the link-level ACK, Node $184_4$ can assume that the link is broken. In the absence of link level ACKs, end-to-end ACKs could be employed. After a period of time of having not received an end-to-end ACK from the access point 186, Node $184_4$ can determine that link 182 is broken. Link level ACKs will detect only the loss of adjacent links, with the result that only the directly affected node will take corrective action. In contrast, end-to-end ACKs can detect the loss of the connection to the access point at any point in the chain.

Nodes $184_7$, $184_6$ and $184_3$ respond to the hello broadcast. Node $184_5$ does not since it knows that Node $184_4$ is its upstream neighbor. Node $184_4$ iteratively and randomly tries these nodes but aborts nodes $184_7$ and $184_6$ when it receives its own registration. If node $184_7$ or $184_6$ were selected, this would result in a loop. Ultimately, node $184_3$ is selected.

As an alternative to repeating the registration process when the link 182 goes down, node $184_4$ can select a primary and a back-up node during the registration process so that it can switch from the primary node to the back-up for communication to the access point 186 based upon a failure to communicate via the primary node. In this example, node $184_2$ would be the primary node, and node $184_3$ would be the back-up node. Node $184_4$ would then store the address of each one of these two nodes.

Figure 8:
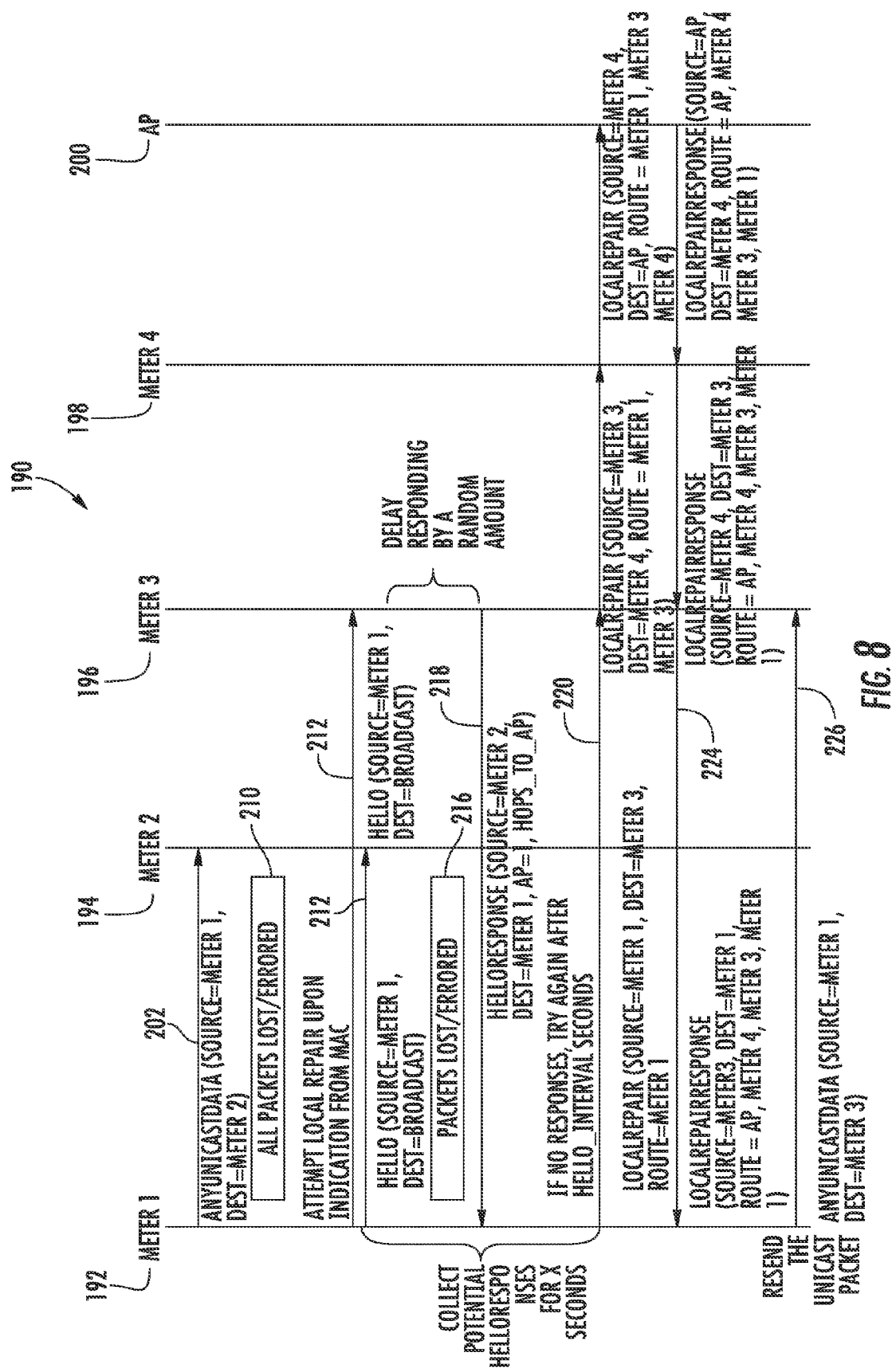
FIG. 8 is a sequence diagram illustrating a successful repair of a broken link in accordance with the present invention.
Figure 9:
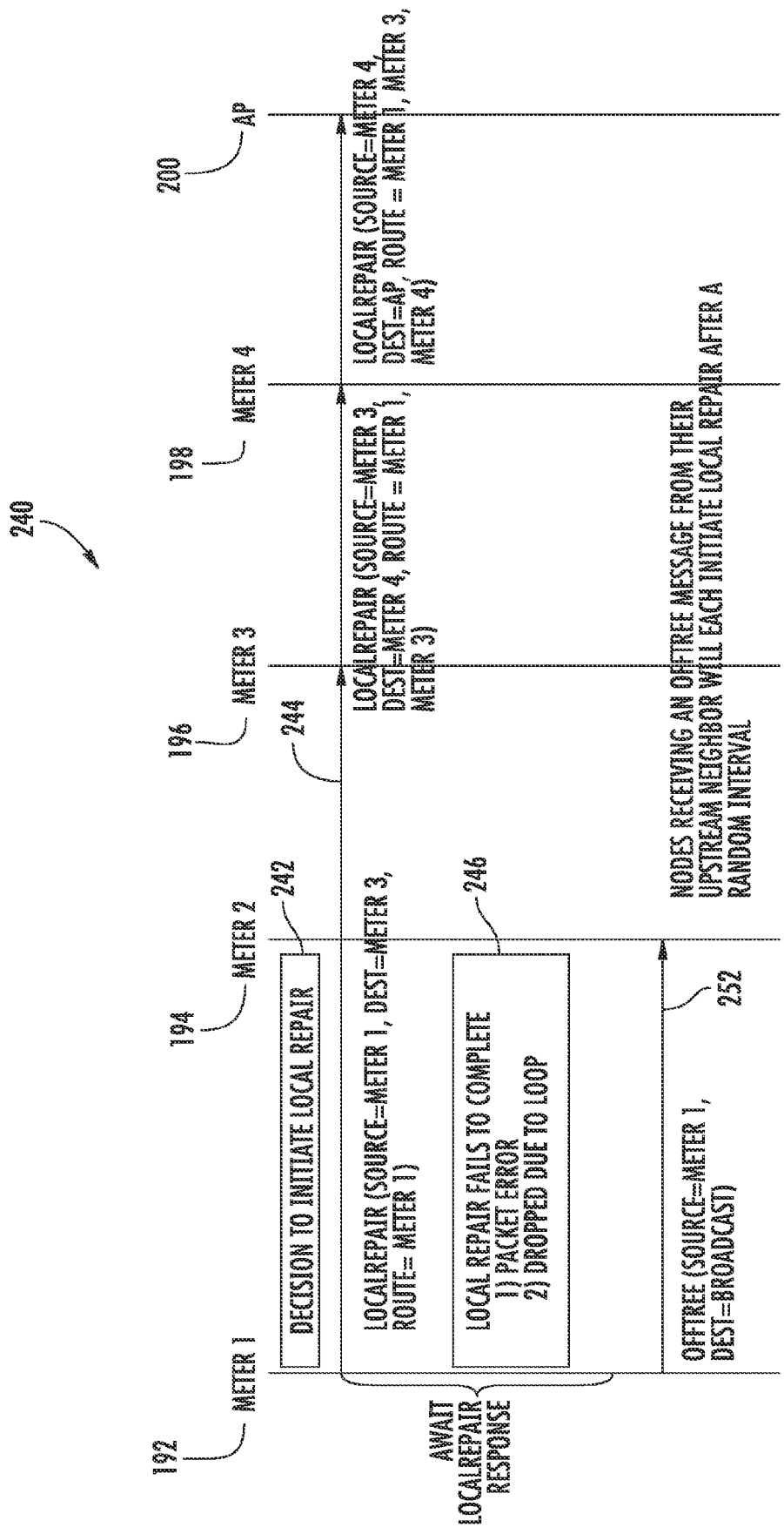
FIG. 9 is a sequence diagram illustrating an unsuccessful repair of a broken link in accordance with the present invention.

Referring now to FIGS. 8 and 9, sequence diagrams of a successful repair of a broken link and an unsuccessful repair of a broken link will now be discussed. The sequence diagram 190 of a successful repair of a broken link will be discussed first. Meter 1 192 is in range with meter 2 194 and meter 3 196. Meter 2 194 and meter 3 196 are in range of meter 4 198. Meter 1 192 uses meter 2 194 (link 202) as its upstream neighbor. The link 202 between meter 1 192 and meter 2 194 is down, which results in all packets being lost or in error 210.

Meter 1 192 attempts a local repair as follows. Meter 1 192 transmits a hello broadcast 212 received by meter 2 194. That same hello broadcast 212 is also received by meter 3 196. The link between meter 1 192 and meter 2 194 is still down, which results in the hello broadcast 212 not being received. However, meter 3 196 transmits a hello response 218. Meter 1 192 makes a local repair by replacing meter 2 194 with meter 3 196 for communicating with the access point 200. Meter 1 192 transmits a register request 220 to the access point 200 which is relayed by meter 3 196 and meter 4 198. The access point 200 transmits a register acknowledgement 224 to meter 1 192 via meter 4 198 and meter 3 196. The access point 200 updates its recorded source route to meter 1 192. If meter 1 192 was the upstream neighbor for other nodes, the access point will also update its recorded source routes for all of those other nodes, replacing the previous meter 2 194 with the new intermediate hop meter 3 196 in each source route. Meter 1 192 is now able to continue transmitting data 226 to the access point 200 via meter 3 196.

The sequence diagram 240 of an unsuccessful repair of a broken link will be discussed in reference to FIG. 9. Meter 1 192 is in range with meter 2 194 and meter 3 196. The link between meter 1 192 and meter 2 194 is down, which results in all packets being lost or in error. Consequently, meter 1 192 makes a decision 242 to initiate a local repair. Meter 1 192 attempts a local repair by transmitting a hello broadcast 244. The repair process is not specific to Meter 3 196, instead, the repair process is undirected. The hello message 244 is a broadcast and does not contain the address of any nodes other than the originator. However, meter 1 192 does not receive a response after waiting. Consequently, meter 1 192 makes a determination 246 that a local repair cannot be made. Meter 1 192 then broadcasts an off tree message 252. Any node downstream receiving the off tree message 252 from their upstream neighbor will each initiate a local repair after a random time interval.

Figure 10:
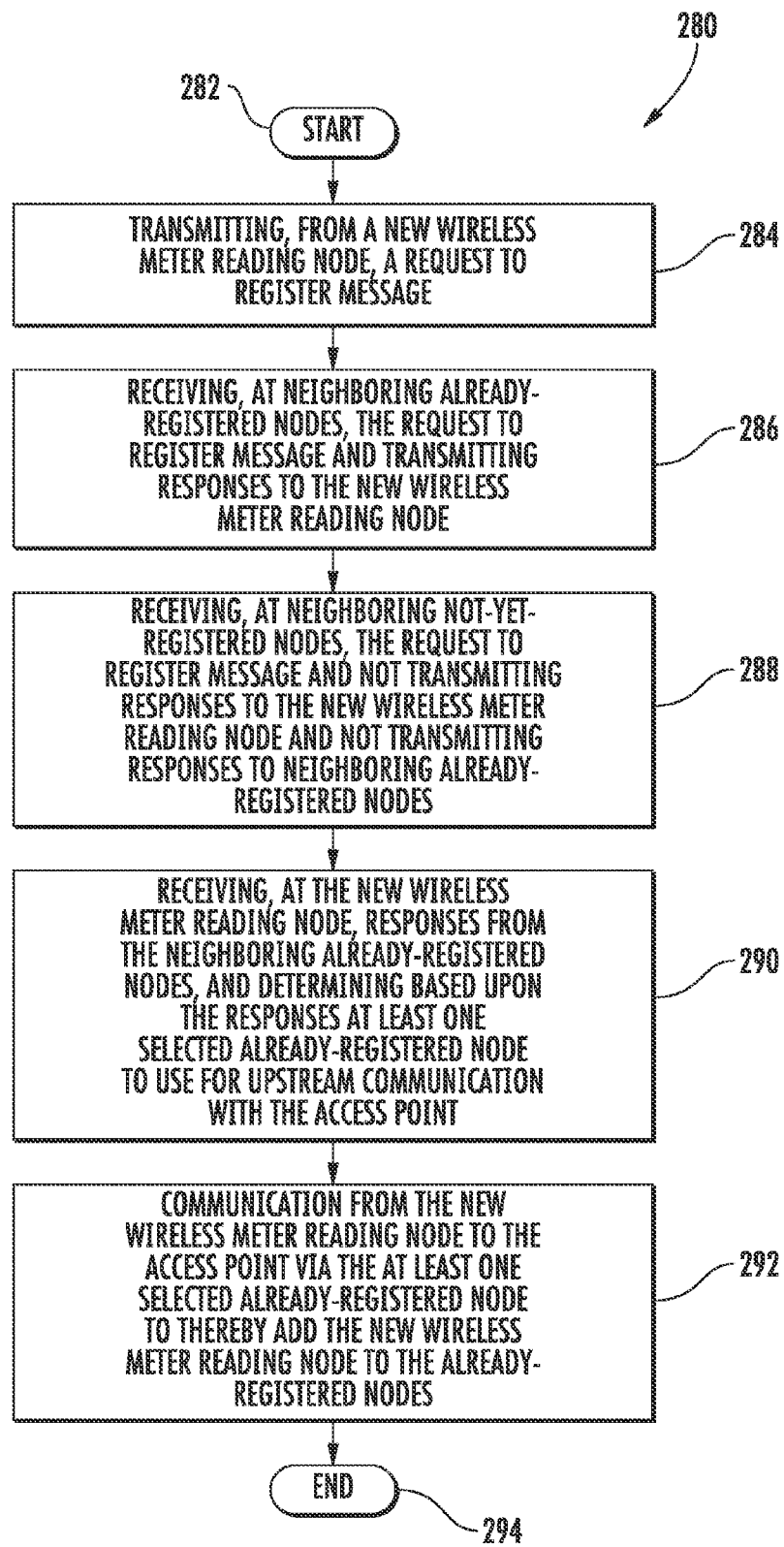
FIG. 10 is a flowchart illustrating a method for operating a meter reading system including wireless meter reading nodes operating with node registration in accordance with the present invention.

A flowchart illustrating a method for operating a meter reading system 50 including wireless meter reading nodes operating with node registration 74 will be discussed in reference to FIG. 10. From the start (Block 282), the method comprises transmitting, from a new wireless meter reading node 142, a request to register message (i.e., a hello broadcast) at Block 284. Neighboring already-registered nodes $122_1$-$122_8$ receive the request to register message, and transmit responses to the new wireless meter reading node 142 at Block 286 after a random interval to avoid collisions. Neighboring not-yet-registered nodes $132_1$-$132_4$ also receive the request to register message but do not transmit responses to the new wireless meter reading node 142 and do not transmit responses to neighboring already-registered nodes $122_1$-$122_8$ at Block 288.

At the new wireless meter reading node 142, responses from the neighboring already-registered nodes $122_7$, $122_8$ are received, and at least one selected already-registered node to use for upstream communication with the access point 130 is determined at Block 290 based upon the responses. The method further comprises at Block 292 communicating from the new wireless meter reading node 142 to the access point 130 via the at least one selected already-registered node $122_7$ to thereby add the new wireless meter reading node 142 to the already-registered nodes $122_1$-$122_8$. The method ends at Block 294.

Figure 11:
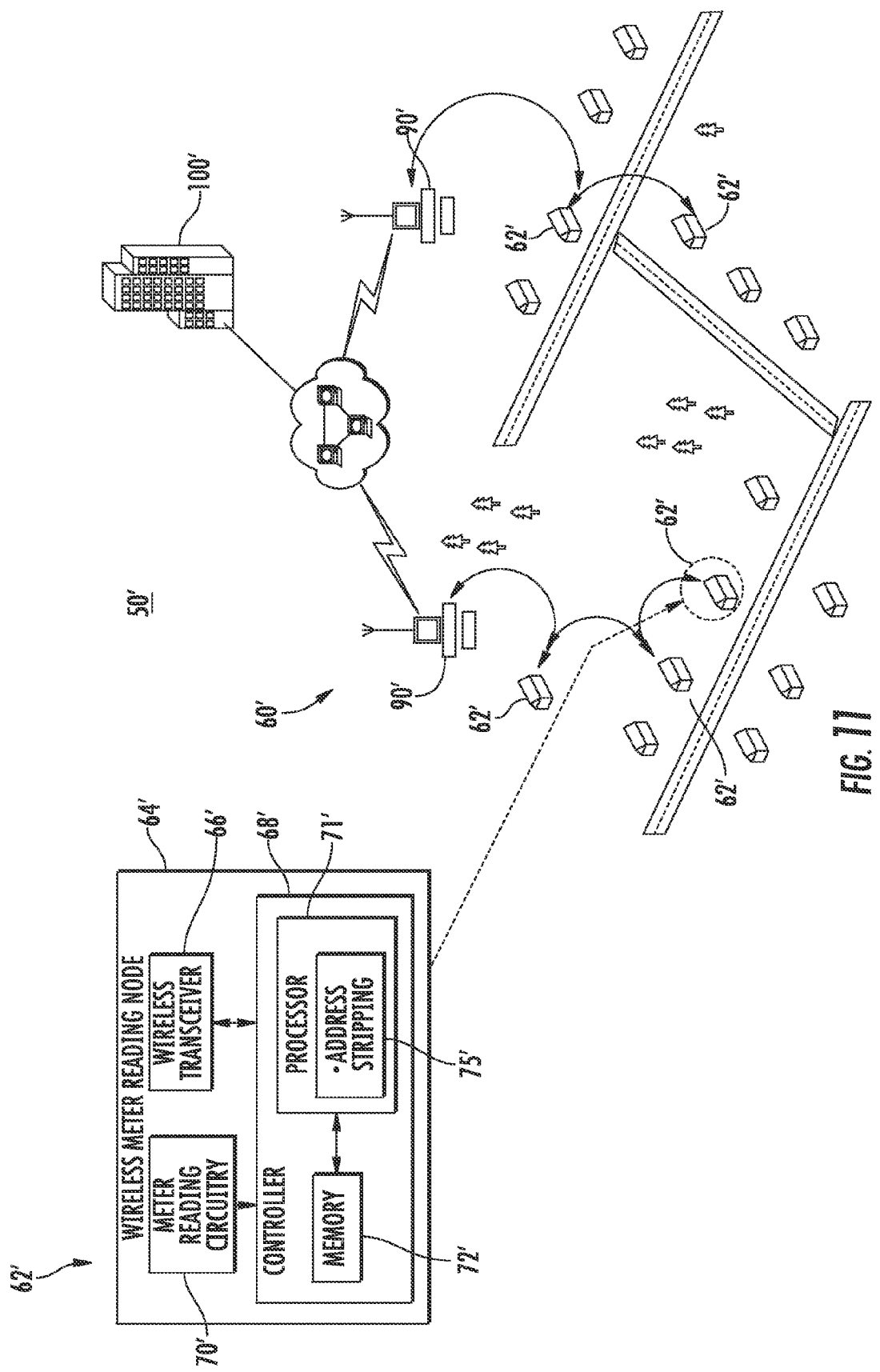
FIG. 11 is a schematic diagram of another embodiment of a meter reading system including wireless meter reading nodes operating with address stripping in accordance with the present invention.

A second aspect of the mesh protocol is directed to address stripping, as will be described with reference to FIGS. 11-13. The description of the wireless meter reading node in FIG. 1 is applicable to FIG. 11, with the addition that the processor 68' further executes an address stripping software module 75' when routing data downstream from the access point 90' to a given node.

Address stripping is also referred to as streamlined source routing. Source routing as used herein refers to a downstream route from the access point 90' to a given node. Streamlined source routing advantageously strips off each node's address at each hop, thereby reducing the size of the remaining source route that is carried in the packet to the given node. Address stripping advantageously reduces memory and processing requirements for the wireless meter reading nodes 62' operating within the network 60'.

Figure 12:
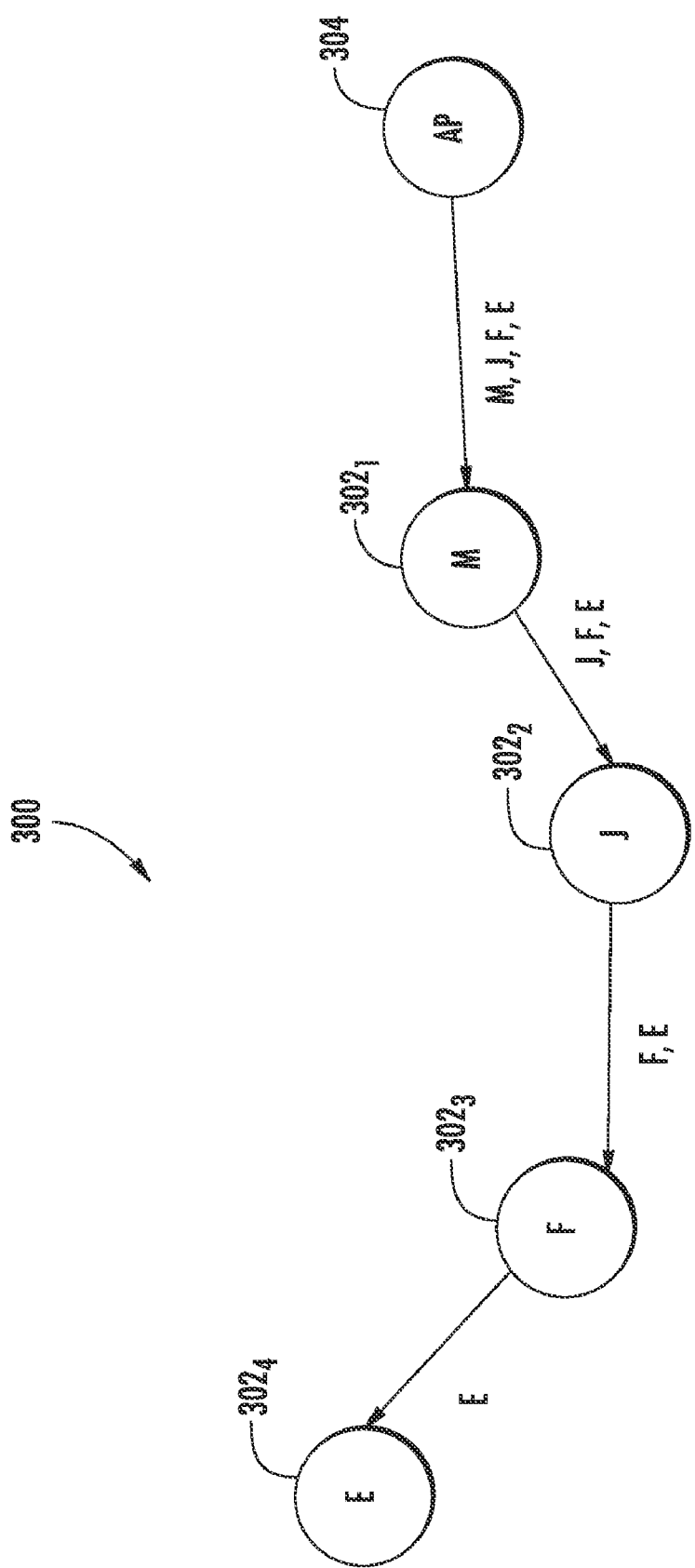
FIG. 12 is a schematic diagram of an access point tree illustrating wireless meter reading nodes operating with address stripping in accordance with the present invention.
Figure 13:
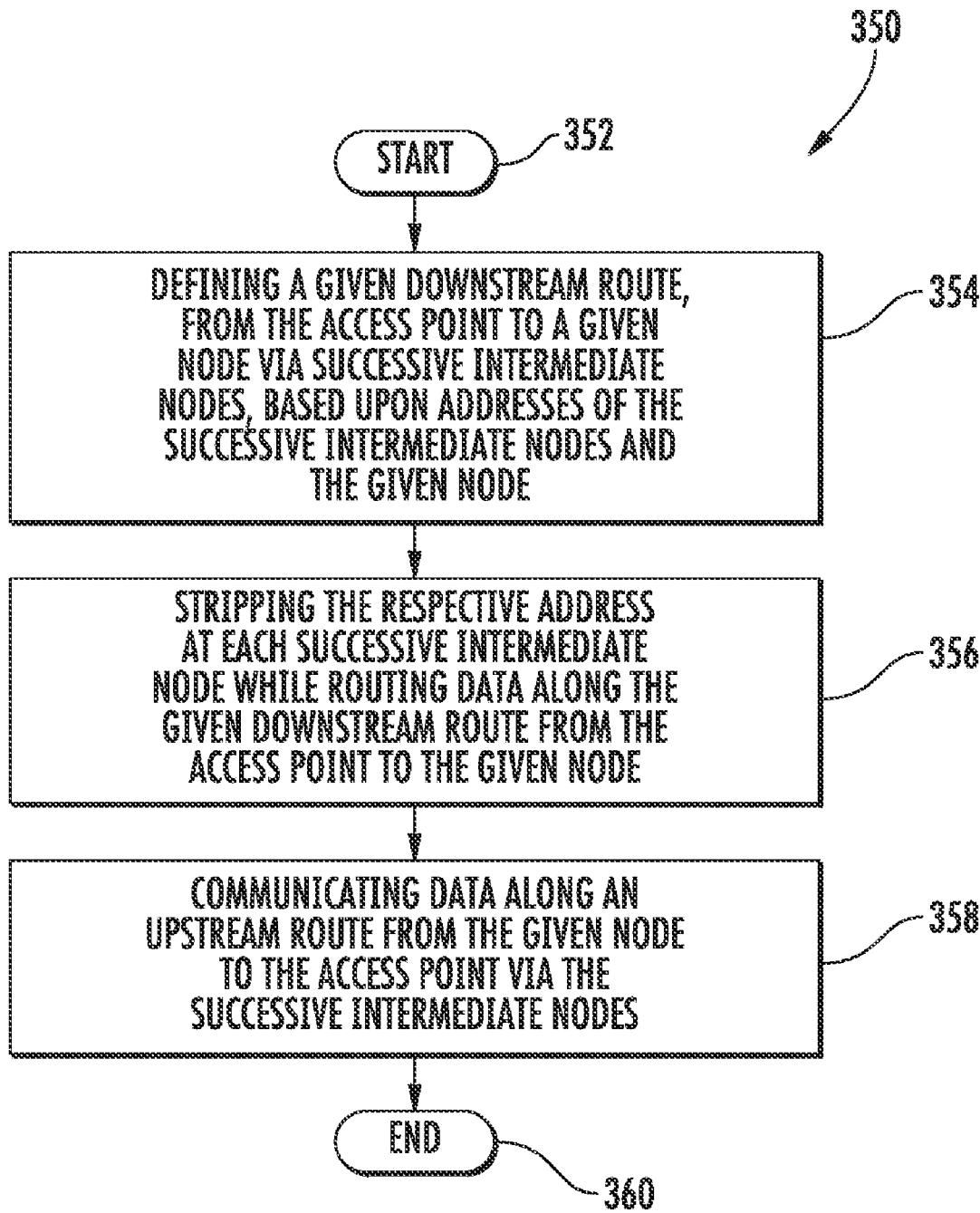
FIG. 13 is a flowchart illustrating a method for operating a meter reading system including wireless meter reading nodes operating with address stripping in accordance with the present invention.

As perhaps best illustrated by the access point tree 300 in FIG. 12, a packet is to be sent from the access point 304 to a given node E $302_4$. The packet is to be passed by successive intermediate node M $302_1$, node J $302_2$, and node F $302_3$. The letter corresponding to each node represents an address for that node.

From the access point 304 to the first node M $302_1$, the packet includes all of the addresses necessary to make it to the given node E $302_4$. Accordingly, node M $302_1$ receives addresses M, J, F, E corresponding to nodes $302_1$-$302_4$. Before routing the packet to node J $302_2$, node M $302_1$ strips off its address M. The packet routed to node J $302_2$ now includes only the remaining addresses J, F, E.

With this mesh protocol, it is not necessary to include the address of node M $302_1$ because in upstream communications, the destination is always an access point 304. Each registered node in the access point tree 300 only needs to store the address of its selected node in order to route data upstream to the access point 304, as discussed above.

Similarly, node J $302_2$ receives the packet along with addresses J, F, E corresponding to nodes $302_2$-$302_4$. Before routing the packet to node F $302_3$, node J $302_2$ strips off its address J. The packet routed to node F $302_3$ now includes only the remaining addresses F, E.

Similarly, node F $302_3$ receives the packet along with addresses F, E corresponding to nodes $302_3$-$302_4$. Before routing the packet to the given node E $302_4$, node F $302_3$ strips off its address F. The packet is routed to the given node E $302_4$ with only the remaining address E.

The streamlined source routing as illustrated in FIG. 12 is asymmetrical. Because in upstream communication with the access point 304, it is understood that the destination is the same for each node, i.e., the access point 304. In upstream communications, each node only needs to forward the packet to its selected upstream node, which in turn forwards the packet to its selected node. This process continues until the packet is received by the access point 304.

In conventional source routing networks, the entire source route (i.e., addresses M, J, F, E) would be routed by each node along with the packet. These addresses are needed so that a return packet can be sent upstream to the access point via a reverse sequence of addresses. The extra addresses take up available bandwidth when transmitting the packet from node to node.

A flowchart 350 illustrating a method for operating a meter reading wireless mesh network comprising a plurality of wireless meter reading nodes $302_1$-$302_4$ in communication with an access point 304 will now be discussed in reference to FIG. 13. Each wireless meter reading node has an address associated therewith. From the start (Block 352), the method comprises at Block 354 defining a given downstream route, from the access point 304 to a given node $302_4$ via successive intermediate nodes $302_1$-$302_3$, based upon addresses of the successive intermediate nodes $302_1$-$302_3$ and the given node $302_4$. The respective address at each successive intermediate node $302_1$-$302_3$ is stripped at Block 356 while routing data along the given downstream route from the access point 304 to the given node $302_4$. The method further comprises at Block 358 communicating data along an upstream route from the given node $302_4$ to the access point 304 via the successive intermediate nodes $302_1$-$302_3$ using methods described above. The method ends at Block 360.

Figure 14:
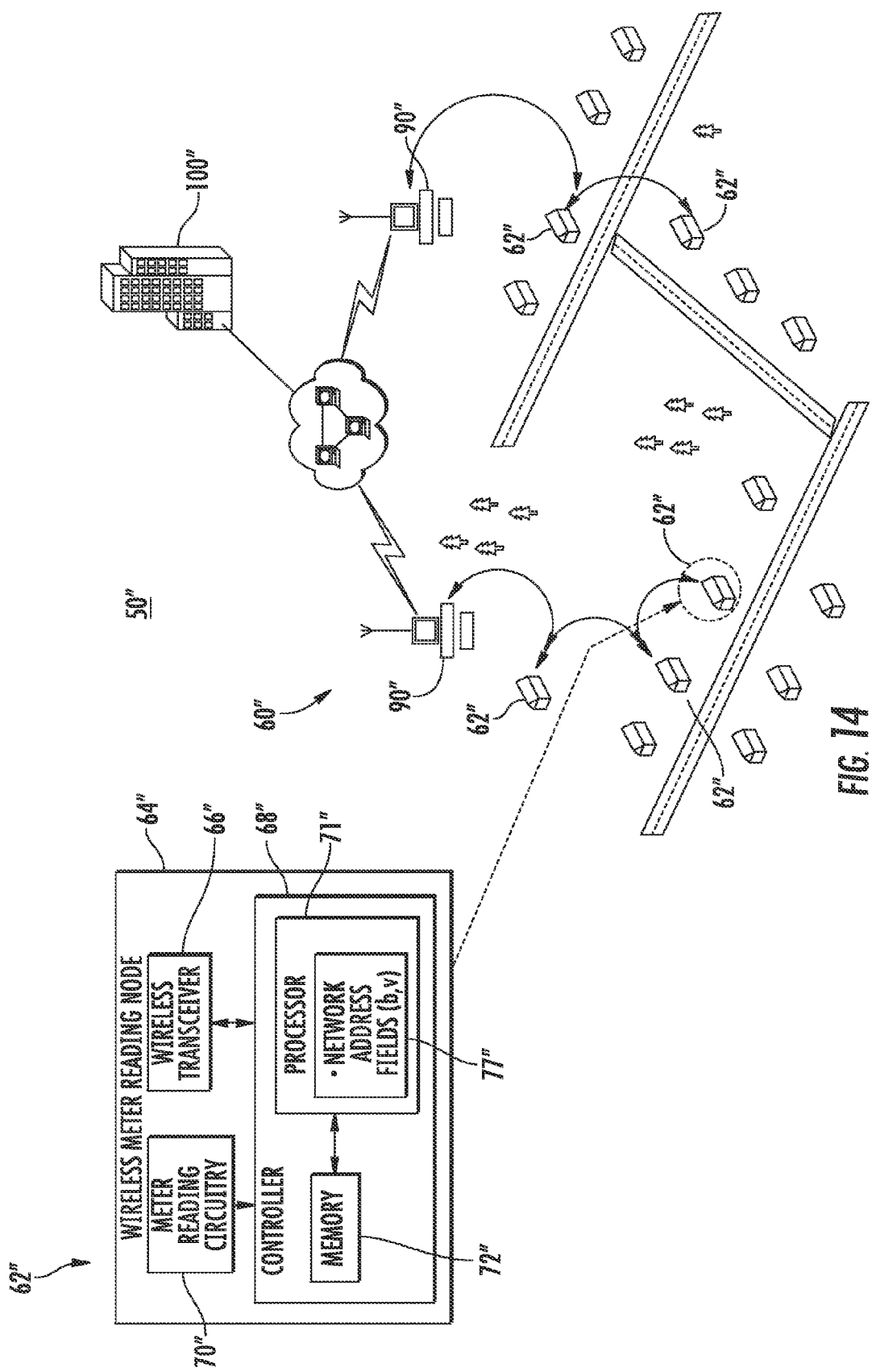
FIG. 14 is a schematic diagram of yet another embodiment of a meter reading system including wireless meter reading nodes operating with network address fields in accordance with the present invention.
Figure 15:
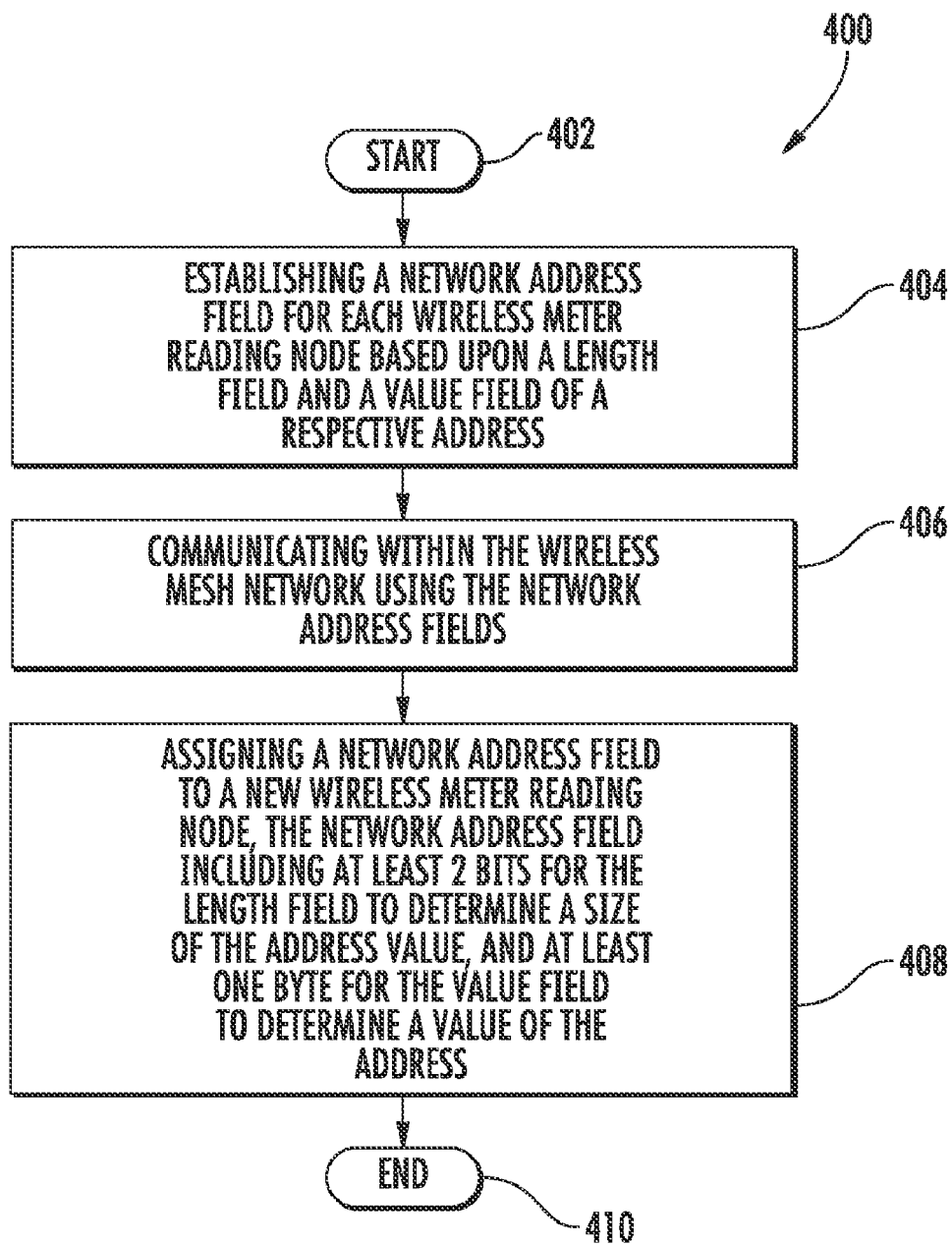
FIG. 15 is a flowchart illustrating a method for operating a meter reading system including wireless meter reading nodes operating with network address fields in accordance with the present invention.

A third aspect of the mesh protocol is directed to network address fields, as will be described with reference to FIGS. 14-15. The description of the wireless meter reading node in FIG. 1 is applicable to FIG. 14, with the addition that the processor 68" further executes a network address fields software module 77". As stated above, each node has an assigned address.

Protocols typically use fixed-size fields for addressing, particularly mesh network protocols. Regardless of the address size, the same number of bits are set aside to represent the address. In the 802.11 standards for WLANs, 6 bytes are used to represent each address, which is enough to support $2^{48}$ nodes. However, this large static address field is inappropriate for wireless meter reading nodes 62" operating in a meter reading wireless mesh network 60". In a packet, there is an address for the node sending the packet, an address for the node receiving the packet, and addresses of any intermediate nodes. Using so many bytes to represent each address is not an efficient use of bandwidth.

To overcome this inefficient use of bandwidth, a node 62" is assigned a network address field upon entering the network 60". The protocol contains a (variable length) network address field. A node is assigned a network address. As will be explained in greater detail below, LV coding allows unlimited expansion without protocol modifications as well as being very efficient for small networks. The network address field is sized to a minimum amount of bytes sufficient to span all nodes within the network 60".

The network address field is preferably coded with a prefix field L and a value field V. The prefix field L specifies the length of the network address for the node 62", and field V is a value of the network address for the node 62". LV together defines the respective network address field for each node 62" within the meter reading wireless mesh network 60".

When assigning a network address to a new wireless meter reading node, the network address field includes at least several bits for the prefix field L to determine a size of the address value, and at least one byte for the value field V to determine a value of the address, as shown in TABLE 1.

TABLE 1

| Address | Network Address Field (L + V) |
|---|---|
| 0-255 | 2 bits + 1 Byte |
| 256-65, 535 | 2 bits + 2 Bytes |
| 65, 536-16, 777, 215 | 2 bits + 3 Bytes |

The 2-bit prefix field L may be coded as shown in TABLE 2. Of course, as can be appreciated by one skilled in the art, the Prefix Field L could be expanded to 3 bits if the ultimate network was expected to grow to an amount larger than can be represented by 4 bytes ($2^{32}$).

TABLE 2

| Prefix Field L | Size of Value Field V |
|---|---|
| 00 | 1 Byte |
| 01 | 2 Bytes |
| 10 | 3 Bytes |
| 11 | 4 Bytes |

For illustration purposes, reference is directed to the above TABLE 1. In the first entry of the address column, a node may be assigned an address between 0 and 255. In the network address field column, 2 bits plus 1 byte are used to represent the assigned address instead of the fixed and typical 6 bytes. The first 2 bits are coded according to Table 2 to correspond to the length field of the address (i.e., a size of the address value) and subsequent byte(s) corresponds to the value field of the address (i.e., a value of the address).

For an address between 0 and 255 (i.e., $2^8$), L+V=2 bits plus 1 byte. L is coded as 00 in this case. This means that 1 byte is used to represent the assigned address for the node 62". Consequently, V is 1 byte and represents the actual value of the assigned address, which may be 250, for example.

For an address between 256 and 65,535 (i.e., $2^{16}$), 2 bits plus 2 bytes. L is coded as 01. This means that 2 bytes are used to represent the assigned address for the node 62". Consequently, V is 2 bytes and represents the actual value of the assigned address, which may be 64,750, for example.

For an address between 65,535 and 16,777,215 (i.e., $2^{24}$), 2 bits plus 3 bytes. L is coded as 10. This means that 3 bytes are used to represent the assigned address for the node 62". Consequently, V is 3 bytes and represents the actual value of the assigned address, which may be 164,250, for example.

In each of the above examples, the number of bytes used to represent the assigned address for any particular node varies depending on the minimum number of bytes sufficient to span all nodes in the network 60". Even as the network 60" grows, L+V can change accordingly to represent higher address values.

The length field L thus illustratively has a fixed length, whereas the value field V has a variable length. The wireless mesh network 60" has a desired maximum number of nodes, and the length field L has a sufficient fixed length for the desired maximum number of nodes. For example, the length field L has a 2 bit length, whereas the value field V has a maximum length of four bytes. The benefit is that it lets one start small, i.e., a short address field in a small network, and then grow the field as required to support more addresses. Additionally, only the nodes with the higher value addresses have the longer address fields.

A flowchart 400 illustrating a method for operating a meter reading wireless mesh network comprising a plurality of wireless meter reading nodes 62" in communication with an access point 90", will now be discussed in reference to FIG. 15. Each wireless meter reading node having an address associated therewith. From the start (Block 402), the method comprises establishing at Block 404 a network address field for each wireless meter reading node 62" based upon a length field L and a value field V of a respective address. The method further comprises communicating within the wireless mesh network using the network address fields at Block 406. At Block 408, a network address field is assigned to a new wireless meter reading node 62". The network address field includes at least 2 bits for the length field L to determine a size of the address value, and at least one other byte for the value field V to determine a value of the address. The method ends at Block 410.

Execution of the node registration software module 74, the address stripping software module 75', and the network address fields software module 77", as described above, may be executed individually or in combination with one another, within the wireless mesh network. In other words, one or more of these functions as provided by software modules 74, 75' and 77" may be combined within the same wireless mesh network.

Many modifications and other embodiments of the invention will come to the mind of one skilled in the art having the benefit of the teachings presented in the foregoing descriptions and the associated drawings. In addition, other features relating to the meter reading wireless mesh network are disclosed in copending patent applications filed concurrently herewith and assigned to the assignee of the present invention and are entitled REGISTRATION OF A NEW NODE TO A METER READING WIRELESS MESH NETWORK AND ASSOCIATED SYSTEM, Ser. No. 12/552,023; and NETWORK ADDRESS FIELD FOR NODES WITHIN A METER READING WIRELESS MESH NETWORK AND ASSOCIATED SYSTEM, Ser. No. 12/551,866, the entire disclosures of which are incorporated herein in their entirety by reference. Therefore, it is to be understood that the invention is not to be limited to the specific embodiments disclosed, and that modifications and embodiments are intended to be included within the scope of the appended claims.

That which is claimed is:

1. A method for operating a meter reading wireless mesh network comprising a plurality of wireless meter reading nodes in communication with an access point, each wireless meter reading node having an address associated therewith, the method comprising:
   defining a given downstream route, from the access point to a given node via successive intermediate nodes, based upon addresses of the successive intermediate nodes and the given node; and
   stripping the respective address at each successive intermediate node while routing data along the given downstream route from the access point to the given node.

2. The method according to claim 1 wherein routing the data comprises routing packet data along with the addresses of the successive intermediate nodes and the given node until stripped by one of the successive intermediate nodes.

3. The method according to claim 1 wherein routing the data comprises routing time-of-day billing data.

4. The method according to claim 1 wherein routing the data comprises routing load control data.

5. The method according to claim 1 further comprising communicating data along an upstream route from the given node to the access point via the successive intermediate nodes.

6. The method according to claim 5 wherein communicating data along the upstream route from one node to a next node is based on the address of the next node.

7. The method according to claim 6 wherein communicating data along the upstream route comprises communicating packet data along with only the address of the next node.

8. The method according to claim 5 wherein communicating data along the upstream route comprises communicating meter reading data.

9. The method according to claim 1 wherein each of the wireless meter reading nodes communicates using an unlicensed frequency band.

10. The method according to claim 1 further comprising communicating between the access point and a remote station.

11. A meter reading system comprising:
a meter reading wireless mesh network comprising an access point, and a plurality of wireless meter reading nodes in communication with said access point, each wireless meter reading node having an address associated therewith, said meter reading wireless mesh network configured to
define a given downstream route, from said access point to a given node via successive intermediate nodes, based upon addresses of the successive intermediate nodes and the given node, and
strip the respective address at each successive intermediate node while routing data along the given downstream route from the access point to the given node; and
a remote station configured to communicate with said access point.

12. The meter reading system according to claim 11 wherein said meter reading wireless mesh network routes the data by routing packet data along with the addresses of the successive intermediate nodes and the given node until stripped by a successive node.

13. The meter reading system according to claim 11 wherein said meter reading wireless mesh network routes the data by routing time-of-day billing data.

14. The meter reading system according to claim 11 wherein said meter reading wireless mesh network routes the data by routing load control data.

15. The meter reading system according to claim 11 wherein said meter reading wireless mesh network is configured to communicate data along an upstream route from the given node to the access point via the successive intermediate nodes.

16. The meter reading system according to claim 15 wherein said meter reading wireless mesh network communicates data along the upstream route from one node to a next node based on the address of the next node.

17. The meter reading system according to claim 16 wherein communicating data along the upstream route comprises communicating packet data along with only the address of the next node.

18. The meter reading system according to claim 15 wherein communicating data along the upstream route within said meter reading wireless mesh network comprises communicating meter reading data.

19. The meter reading system according to claim 11 wherein each of the wireless meter reading nodes communicates using an unlicensed frequency band.

20. A wireless meter reading node for a meter reading wireless mesh network comprising a plurality of wireless meter reading nodes in communication with an access point, each wireless meter reading node having an address associated therewith, the wireless meter reading wireless node comprising:
a wireless transceiver; and
a controller coupled to said wireless transceiver and configured to route data along a defined given downstream route, from the access point to a given node via successive intermediate nodes, based upon addresses of the successive intermediate nodes and the given node, said controller stripping the respective address of the wireless meter reading node when it is a successive intermediate node while routing data along the given downstream route.

21. The wireless meter reading node according to claim 20 wherein said controller routes the data by routing packet data along with the addresses of the successive intermediate nodes and the given node until stripped by a successive node.

22. The wireless meter reading node according to claim 20 wherein said controller routes the data by routing time-of-day billing data.

23. The wireless meter reading node according to claim 20 wherein routing the data by said controller within the meter reading wireless mesh network comprises routing load control data.

24. The wireless meter reading node according to claim 20 wherein the meter reading wireless mesh network is configured to communicate data along an upstream route from the given node to the access point via the successive intermediate nodes.

25. The wireless meter reading node according to claim 24 wherein said wireless transceiver communicates data along the upstream route from one node to a next node based on the address of the next node.

26. The wireless meter reading node according to claim 25 wherein said wireless transceiver communicates data along the upstream route within said meter reading wireless mesh network, the data comprising packet data along with only the address of the next node.

27. The wireless meter reading node according to claim 24 wherein said wireless transceiver communicates data along the upstream route within said meter reading wireless mesh network, the data comprising meter reading data.

28. The wireless meter reading node according to claim 20 wherein said wireless transceiver communicates using an unlicensed frequency band.

* * * * *